United States Patent [19]

Ferrara, Jr.

[11] Patent Number: 5,337,925
[45] Date of Patent: Aug. 16, 1994

[54] INJECTION DEVICE FOR INJECTING A FLUID INTO FOOD

[75] Inventor: Daniel A. Ferrara, Jr., Bantam, Conn.

[73] Assignee: ISPG, Inc., New Milford, Conn.

[21] Appl. No.: 96,454

[22] Filed: Jul. 26, 1993

[51] Int. Cl.⁵ .............................................. B65D 37/00
[52] U.S. Cl. .................... 222/214; 222/325; 604/214; 604/216
[58] Field of Search ................. 222/95, 156, 157, 214, 222/215, 325, 470, 471, 80, 191; 604/212, 214, 216, 228, 232

[56] References Cited

U.S. PATENT DOCUMENTS

| | | | |
|---|---|---|---|
| 2,849,159 | 8/1958 | Kaufmann | 604/216 X |
| 2,948,238 | 8/1960 | Hoffman | 222/470 X |
| 3,249,258 | 5/1966 | Kramer et al. | 222/471 X |
| 3,410,457 | 11/1968 | Brown | 222/191 |
| 4,131,217 | 12/1978 | Sandegren | 222/214 X |
| 4,692,157 | 9/1987 | Landau et al. | 604/214 |
| 5,085,346 | 2/1992 | Wright | 222/156 X |
| 5,267,974 | 12/1993 | Lambert | 604/216 X |
| 5,273,186 | 12/1993 | Widmer | 222/105 X |

*Primary Examiner*—Gregory L. Huson
*Attorney, Agent, or Firm*—Dallett Hoopes

[57] ABSTRACT

This injection device comprises a housing having a handgrip for operating it. A collapsible fluid container is adapted to fit in the housing under the pressure element of the handgrip. The container has a fill opening with a closure and an injection stem extending out of the housing so that when the handgrip is squeezed, the collapsible fluid container will compress the fluid within it and drive the fluid out through the stem. Conversely, when the fluid container is compressed, the stem can be submerged in fluid and the handgrip spread to enlarge the container and suck fluid into the container.

16 Claims, 2 Drawing Sheets

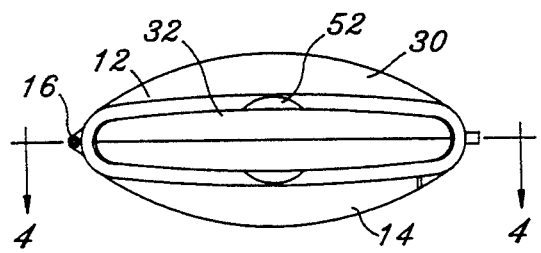
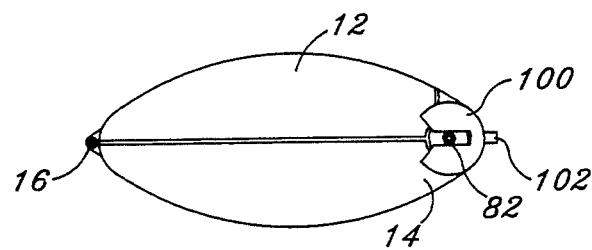
Fig.2  Fig.3
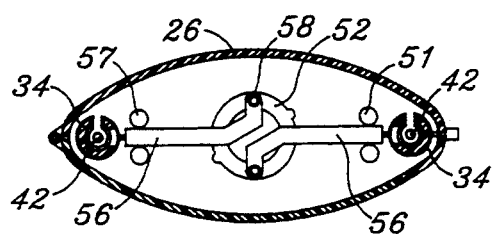
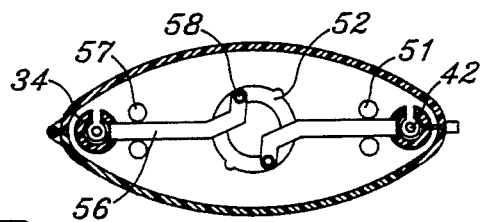
Fig.5  Fig.5a
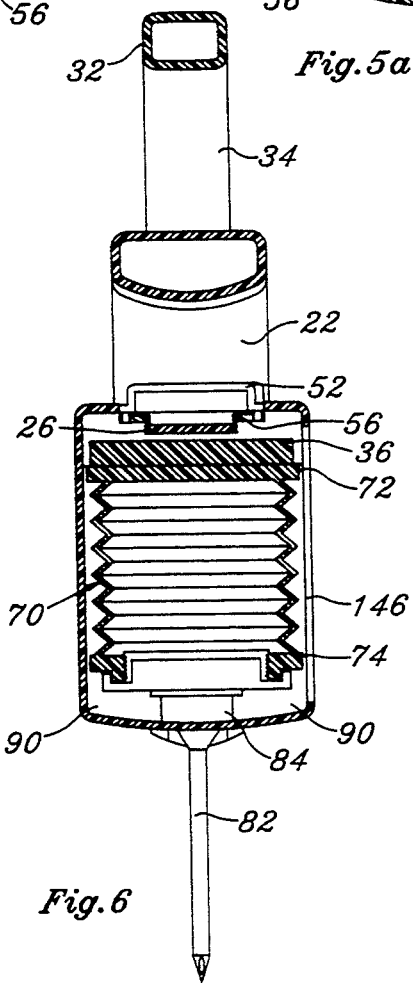
Fig.6

INJECTION DEVICE FOR INJECTING A FLUID INTO FOOD

BACKGROUND OF THE INVENTION

1. Field of the Invention

This invention relates to an injection device for injecting a sauce or other flavoring fluid into a food such as a meat, fruit or baked product either before or after cooking. More specifically, the invention relates to an injecting device operable by a hand grip and comprising an internal bellows or other collapsible container compressed by the hand grip to inject through a tubular stem on the injection device the aforesaid fluids.

Interest in gourmet cooking and foods bas swept across the population to an extent as never before. A large percentage of the public is now interested in cooking and in the taste and texture of foods. Gourmet cooks are commonplace and there is an increasing public appetite for foods having new and unusual textures and taste. Cooking periodicals present new ways of preparing foods.

It is now common to coat meats in sauce to give a unique taste. Sometimes this is done during the cooking process as by basting with new formulas. The present invention is especially concerned with injecting into foods, with emphasis on meats, for example, either before or after cooking, a sauce or the like which will add a desirable flavor to the treated food. The invention is in the form of an injection device, especially designed for easy use by the cook or other food preparer.

2. Description of Related Art including Information Disclosed under §§1.97 to 1.99

The prior art does include injection devices and collapsible containers.

Bellows-type containers, for instance, are old. A number are in the art, a pertinent example being the collapsible gas tank shown in the U.S. Pat. No. 2,432,025 to Henry W. Lorenz which issued Dec.2, 1947. This kind of a tank is collapsed as the fuel inside is used, to avoid the formation of air bubbles. A bellows-type container or reservoir is shown in the U.S. Pat. No. 1,752,085 which issued Mar. 25, 1930 to James M. Hinkle.

Other interesting art includes the dispensing device shown in Sealfon et al U.S. Pat. No. 4,557,728 in which a collapsible bag is spring-biased to collapse, metering fluid through an intravenous site. Also, injection devices have taken the form of collapsible bags attached to the stem, an example being U.S. Pat. No. 4,581,021 which issued Apr. 8, 1986 to Landau et al.

SUMMARY OF THE INVENTION

The present invention is an injecting device for injecting flavor-enchancing fluid into food and comprising a housing having a handgrip moving a pressure element within it and a collapsible fluid container adapted to fit in the housing under the pressure element. The container has a filler closure and a tubular stem extending out of the housing so that when the stem is inserted into food and the handgrip is squeezed, the container will be compressed and fluid will be driven out through the stem.

BRIEF DESCRIPTION OF THE DRAWINGS

Further objects and features of the invention will be apparent from the following specification and a study of the accompanying drawings, all of which disclose a non-limiting embodiment of the invention. In the drawings:

FIG. 2 is a top plan view;

FIG. 3 is a bottom plan view;

FIG. 4 is a center line sectional view along the length of the syringe;

FIG. 4a is an enlarged fragmentary view taken on the line 4a—4a in FIG. 4 showing a modified form of connection between the pressure plate and bellows;

FIG. 5 is a sectional view taken on the line 5—5 of FIG. 4;

FIG. 5a is a view similar to FIG. 5 but showing the detents extended; and

FIG. 6 is a sectional view taken on the line 6—6 of FIG. 4.

DESCRIPTION OF THE PREFERRED EMBODIMENT

Figure 1:
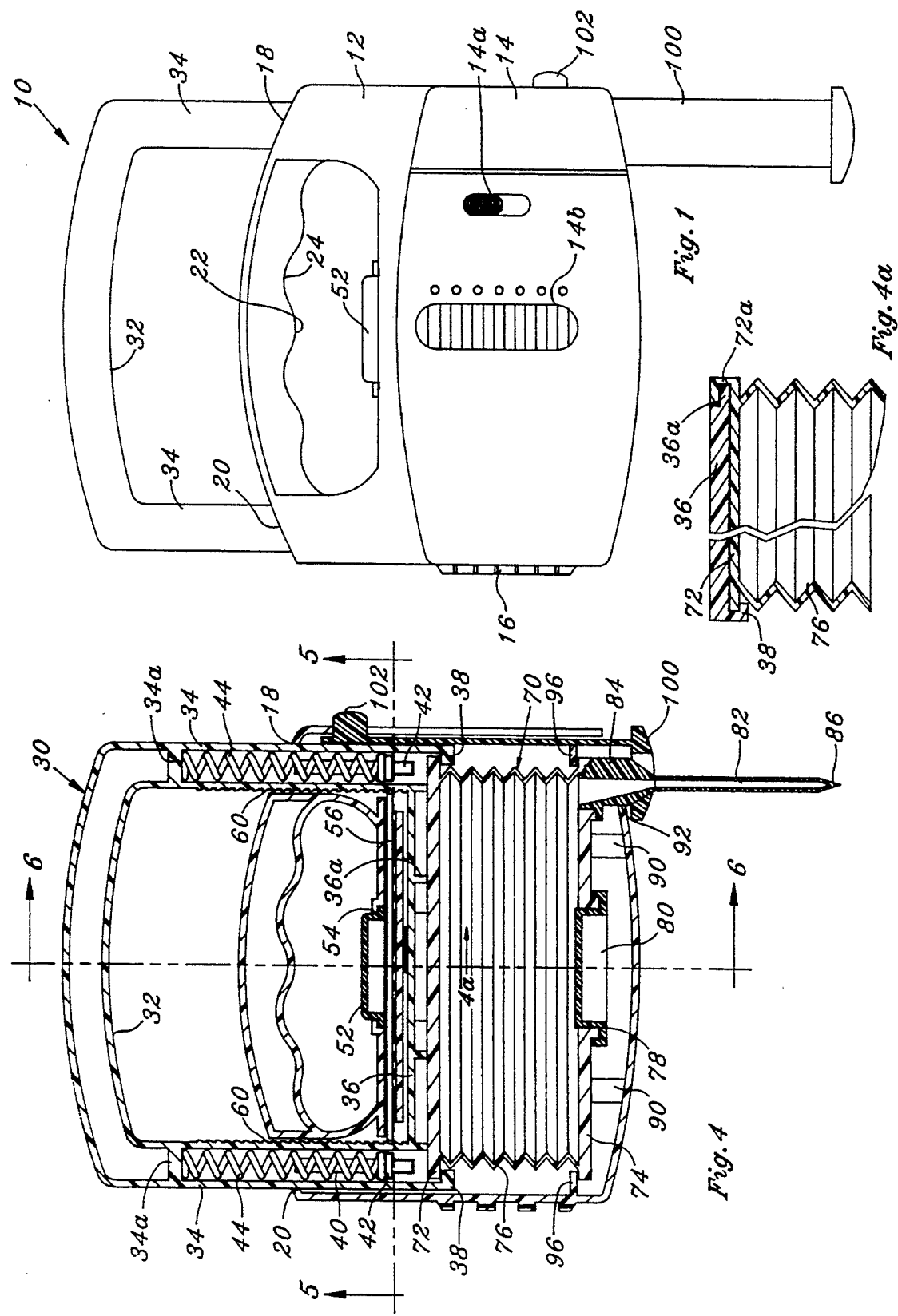
FIG. 1 is a front elevational view of an injection device embodying the invention.

An injection device embodying the invention is generally designated 10 in FIG. 1. It comprises a hollow housing 12 having a front opening with a door 14 hinged thereover as at 16. The upper end of the housing 12 is formed with upwardly facing apertures as at 18 and 20 and the housing itself has a large transverse opening 22. The upper margin of the opening defines a squeeze bar 24 having an undulating lower surface to provide a convenient place for the fingers.

The housing is preferably molded in two lengthwise halves not counting the door 14. The halves are sealed together to comprise the enclosure of the housing. A detent support floor 26 is parallel to and spaced below the bottom of the opening 22 secured in position by means not shown.

A compression element 30 is provided and shaped like an inverted "U". It includes a broad bight 32 or palm rest and tubular downward legs 34. The palm rest 32 and squeeze bar 24 comprise a hand grip. The compression element further includes a pressure plate 36 which extends between the lower ends of the legs 34 and is ribbed on its underside as at 36a for stiffening. Beneath the pressure plate 36 the outward sides of the legs 34 extend downward and turn inward in tongues 38.

The tubular legs 34 are slotted as at 40 and receive spring supports 42 which are secured to the side wall of the housing just below the opening 22. Wound springs 44 are disposed in the tubular legs 34 respectively and their upper ends engage the internal transverse walls 34a. The lower ends of the springs 44 engage the spring supports 42 mounted in the housing wall and the springs 44 are, hence, under compression urging the pressure member 30 upward.

A detent assembly 50 is provided comprising a dial 52 rotatable in an opening 54 in a flat wall in the bottom of the transverse opening 22. The dial 52 is provided with generally L-shaped detent legs 56 which are pivoted to the dial 52 at opposite sides thereof by pins 58. The ends of the legs 56, when the dial is turned to activate the detents (FIG. 5a), extend between locating nibs 57 in floor 26 to a point adjacent saw-toothed notches 60 on the inside of the legs 34. Thus, as the pressure member is pushed toward the housing, and the detents are "on", the detents will "click" each time one of the spaced saw-toothed detents passes it. The dial itself may carry indicia on its top surface to register with marks on the wall thereadjacent to indicate when the detent is "on" or "off".

A pressure container 70 is provided in the form of a bellows having upper and lower end plates 72 and 74. The end plates are, in the embodiment shown, oval in shape to conform generally to the interior of the housing. Between the end plate 72 and 74 is the accordian-like collapsible wall 76 of the fluid container. The lower wall 74 is formed with a large opening 78 normally closed by a screw plug 80. Rightward (FIG. 4) of the fill opening 78 is the tubular stem 82 which comprises a tubular plastic base 84 which intercepts the lower wall 74 and provides communication with the inside of the container 70 to the tubular injection stem 82. The stem is provided with the usual terminal outlet opening 86.

Underlying stops 90 are provided extending upward into the housing from the lower wall thereof to support the lower wall 74 of the container.

To ready the injection device of the invention for use, the door (which may be provided with a latch 14a and a viewing aperture 14b to see the condition of the bellows) is opened and the container 70 removed. The container is inverted and the screw plug 80 is then removed from the fill opening 78 and the selected fluid is poured into the container 70.

During the filling the upper plate 72 and lower plate 74 are held spaced apart by the resilience of the bellows. The plug is returned to the fill opening. As explained below, the bellows may be filled by aspiration.

The container thus filled is maneuvered into the housing, stem 82 extending first into the opening 92. The container is interlocked with the structure so that its upper plate 72 of the bellows is disposed between the pressure plate 36 and the tongues 38. Alternatively, or in addition to the tongues 38, a hooking section 72a on the top of the upper plate 72 of the bellows may embrace a downwardly offset central section 36a of the pressure plate (FIG. 4a) to unite the two plates 72, 36 for movement together. The lower plate 74 of the bellows is disposed between the supports 90 and the tongues 96. The door is then closed and latched.

To dispense fluid from the container 70 to the food, the stem is first either stuck into the food or placed on the surface of the food and the palm rest 32 and squeeze bar 24 are gripped by the operator's hand. As the operator squeezes this hand grip, the pressure member 30 moves downward, imparting a downward movement to the upper plate 72. This may be accompanied by clicks of the detents 56 as the notches 60 pass by (if the detent is "on"). This downward movement compresses the fluid inside the container 70, driving it down the stem 82 and out the opening 86 into the meat.

A tubular guard 100 is shown disposed between the front right end of the housing and leg 34.

When the injection device described is not in use, the tubular guard 100 is pulled downward out of its telescoped position shown in FIG. 4 to virtually encircle the needle 82 (FIG. 1). This may be done by lowering the guard operating tab 102 operable in a vertical slot in the front end of the housing.

The injection device of the invention is readily filled and readily loaded. In filling by aspiration, as mentioned, the container is totally or partly collapsed by lowering plate 36. The stem is then submerged in a supply of fluid and the end plate 72 is raised by lifting palm rest 32 relative to bar 24. This will draw the fluid up into the container. Again it should be stressed that the pressure plate 36 has means, such as hooks 38, which entrap the upper plate 72 of the bellows. Similar means, such as hooks 96 hold down the bottom plate 74 during the aspiration.

The device is also easy to operate and easy to clean, thanks to the wide opening 78. The varieties of materials which may be selected for use in the device are only limited by the imagination of the user.

Thus, the versatility of the injection device of the invention should be appreciated. Aside from a principal purpose to inject and dispense flavor-enhancing condiments, sauces, etc. into the food, particularly meat, it may be used to inject fluids to tenderize meat, to inject vitamins, minerals or other food supplements in a variety of foods. Industrial uses are also envisioned. The injection device of the invention can dispense dies, colorings, lubricants, cements, grout, fillers, softeners, hardeners. It can apply glue and epoxies. Medical uses come to mind. It can be used to inject serums and aspirate fluids. Other uses are contemplated.

It should be understood that the invention is not limited to the embodiment shown but the invention is instead defined by the scope of the following claim language, expanded by an extension of the right to exclude as is appropriate under the doctrine of equivalents.

What is claimed is:

1. An injection device for injecting a fluid into food comprising:
   a. a fluid container having parallel upper and lower walls and a collapsible wall inbetween, the container having a projecting tubular injection stem thereon operatively connected to the inside of the container;
   b. a housing comprising an enclosure having an interior cavity, a stem opening and an operable door which, when open, receives the container within the cavity, the container resting on the bottom of the housing with the injection stem extending out through the stem opening, the top wall of the housing being formed with upwardly facing spaced apertures and a lateral squeeze bar at the upper end of the housing; and
   c. a compression element comprising a pressure plate disposed against the upper wall of the container, a palm rest above the squeeze bar having legs extending downward through the spaced apertures in the housing respectively and connected to the pressure plate whereby when the squeeze bar and palm rest are squeezed together by the grip of a single hand, the container is at least partly collapsed to apply pressure to drive fluid out the injection stem.

2. An injection device as claimed in claim 1 wherein the stem extends downward from the lower wall of the container.

3. An injection device as claimed in claim 1 wherein the container has a fill opening in one of its walls and a sealing closure is removably disposed in said fill opening.

4. An injection device as claimed in claim 1 whereby spring means are compressively disposed between the housing and the legs.

5. An injection device as claimed in claim 4 wherein the legs are tubular and have transverse walls adjacent the upper ends thereof and slotted lower portions, and the housing has projections extending through the slots respectively and the spring means comprises a pair of helical springs respectively disposed in the tuabular legs and are compressed between the transverse wall and the projection.

6. An injection device as claimed in claim 1 wherein an extendable substantially tubular guard is slidably disposed in the housing and movable from a retracted position to a guard position substantially surrounding the injection stem.

7. An injection device as claimed in claim 1 wherein the legs have spaced indents and releasable detent means are disposed in the housing to selectively engage the legs engaging the detents to indicate an incremental lowering of the pressure plate.

8. An injection device as claimed in claim 1 wherein the door is hingedly attached to the rest of the housing and is provided with latching means.

9. An injection device as claimed in claim, wherein a portion of the sidewall is apertured to make visible the position of the top wall of the container to indicate the condition of the container.

10. An injection device as claimed in claim 1, wherein the container is a bellows.

11. An injection device as claimed in claim 1, wherein the stem extends downward from the lower wall of the housing and is disposed directly in line with one of the legs.

12. An injection device as claimed in claim 1, wherein the container has selectively releaseable hook means on its upper wall hooking over the pressure plate to unite them for movement together so that the palm rest may be raised relative to the squeeze bar to enlarge the container to aspirate fluid through the stem.

13. An injection device as claimed in claim 1 wherein tongue means are connected to the housing to hold the lower wall of the container down.

14. An injection device comprising:
  a. a fluid container having parallel upper and lower walls and a collapsible wall inbetween;
  b. a projecting injection stem operatively connected to the inside of the container;
  c. a housing comprising an enclosure having an interior cavity, a stem opening and an operable door which, when open, receives the container within the cavity with the lower wall held adjacent the bottom of the housing and the injection stem extending out through the stem opening, the top wall of the housing being formed with aperture means and a lateral squeeze bar at the upper end of the housing; and
  d. an operating element connected to the upper wall of the container and extending upward through the aperture means in the housing and having a center palm rest section whereby when the squeeze bar and palm rest section are squeezed together, the upper and lower walls of the container are moved toward each other to cause flow of fluid in the stem and when the squeeze bar and palm rest section are spread apart, fluid may be aspirated through the stem up into the container.

15. An injection device comprising:
  a. a fluid container defined by parallel rigid panels and a collapsible connecting wall inbetween said panels;
  b. a projecting injection stem operatively connected to the inside of the container;
  c. a housing comprising an enclosure having opposite walls defining an interior cavity, one of said housing walls having a stem opening, the enclosure receiving the container within the cavity with one rigid panel bearing on said one wall of the housing and the injecting stem extending out through the stem opening, the opposite wall of the housing being formed with aperture means and having a lateral squeeze bar formed therein; and
  d. an operating element associated with the opposite wall of the housing and engaging the opposite rigid panel of the container inside the enclosure and extending upward through the aperture means in the housing and having outside the enclosure a palm rest whereby when the squeeze bar and palm rest are squeezed together, the parallel panels of the container are moved toward each other to cause flow of fluid in the stem.

16. An injection device as claimed in claim 15 wherein first retaining means retains the one rigid panel adjacent the one housing wall and second retaining means retains the opposite rigid panel adjacent the operating element so that when the squeeze bar and palm rest section are spread apart fluid may be aspirated through the stem into the container.

* * * * *